United States Patent

[11] 3,557,351

[72] Inventor George I. Doering
 Columbus, Ohio
[21] Appl. No. 630,393
[22] Filed Apr. 12, 1967
[45] Patented Jan. 19, 1971
[73] Assignee Industrial Nucleonics Corporation
 a corporation of Ohio

[54] PROPERTY MEASUREMENT SIGNAL FILTERING METHOD AND APPARATUS FOR ELIMINATING PREDETERMINED COMPONENTS
 30 Claims, 13 Drawing Figs.
[52] U.S. Cl. .................................................... 235/151.3,
 235/151.1, 250/83.3
[51] Int. Cl. .................................................... G05d 5/02
[50] Field of Search .......................................... 235/151.3;
 250/83.3D, 219; 235/151.1, 150.1; 250/83.3

[56] References Cited
 UNITED STATES PATENTS
3,007,052 /1961 Hickman et al. ............... 250/83.3D
3,067,939 /1962 Ziffer .................................... 235/183
3,190,261 /1965 Ziffer .............................. 250/83.3DX
3,216,241 /1965 Hansen .......................... 250/83.3DX
3,248,545 /1966 Hansen ............................ 250/83.3D Primary Examiner—Malcolm A. Morrison
Assistant Examiner—Edward J. Wise
Attorneys—William T. Fryer, III, C. Henry Peterson and James J. O'Reilly ABSTRACT: An error signal filtering technique for a control system wherein the rejection or cutoff bands of a filter circuit are shifted in accordance with the speed of the material being controlled. In one embodiment, the error signal from a thickness gauge is averaged over several complete cycles of a predominant uncontrollable frequency component. In another embodiment, an average value of an error signal from a sheet scanning gauge is provided for one or more zones extending down the length of the sheet by controlling the scanning speed of the gauge to provide signal integration over complete cycles of the predominant frequency component.

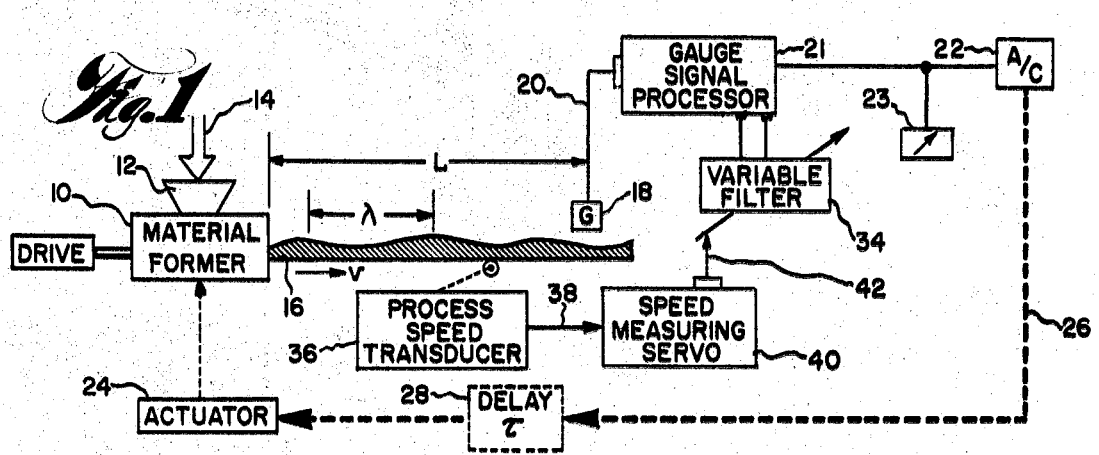
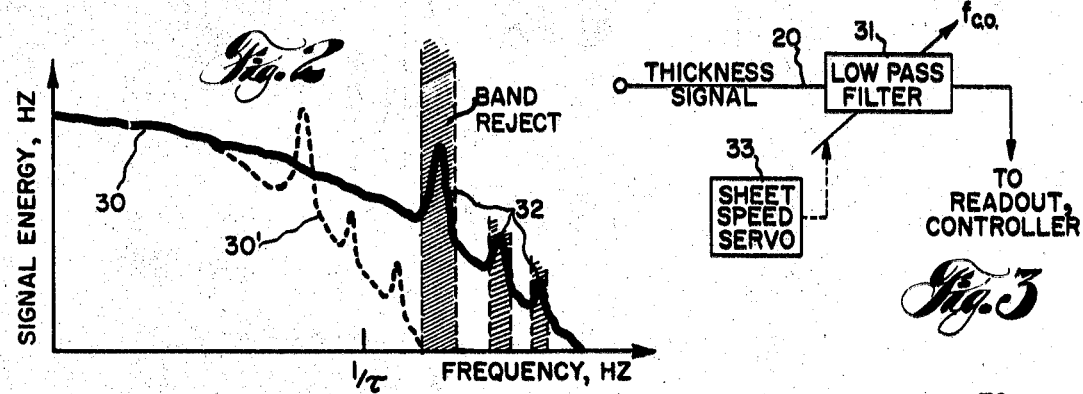
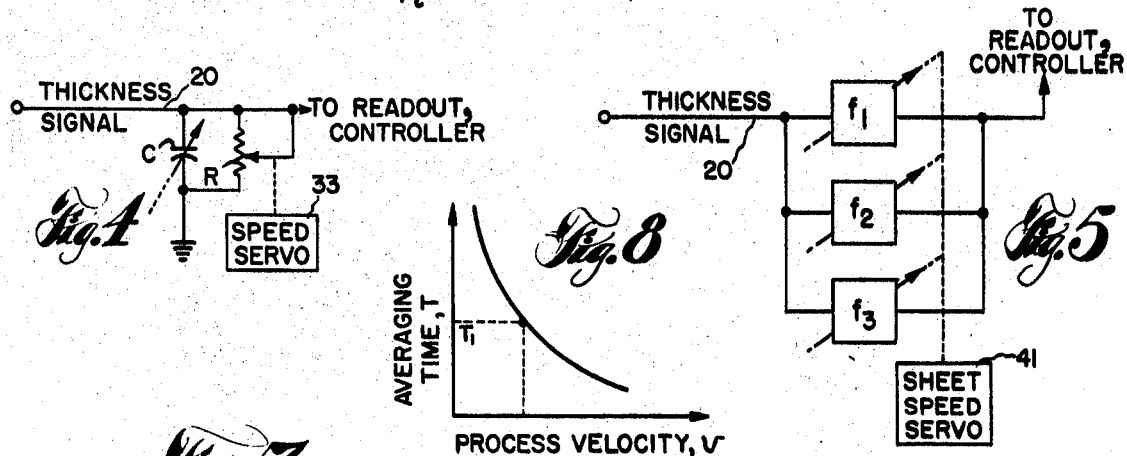
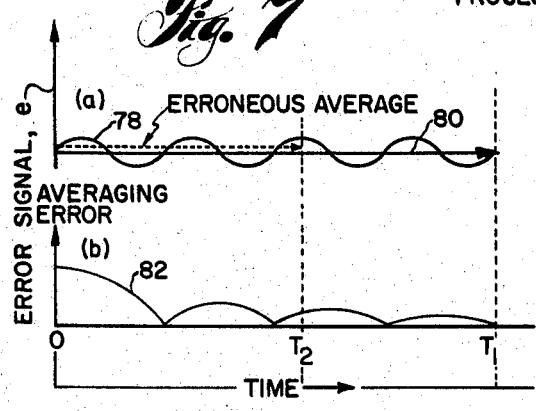

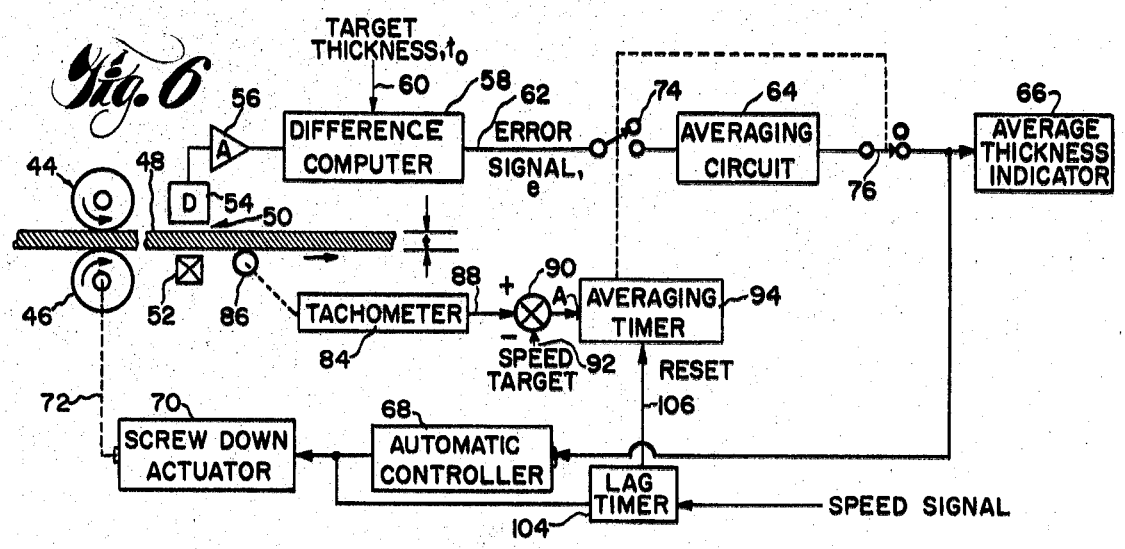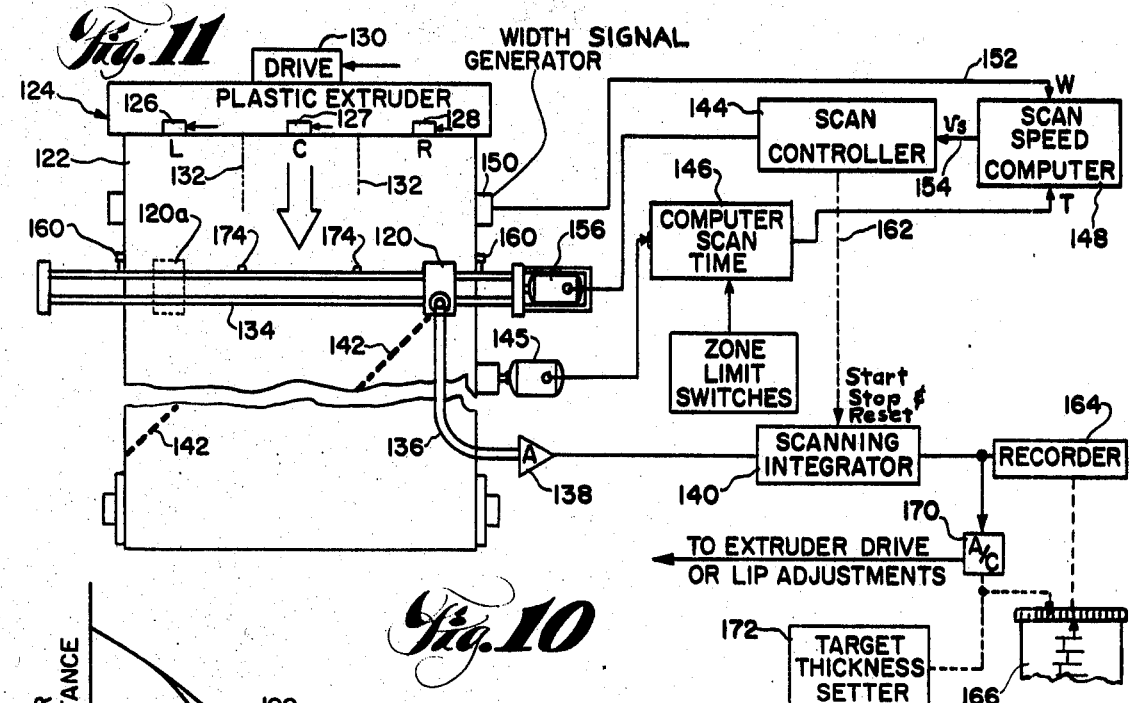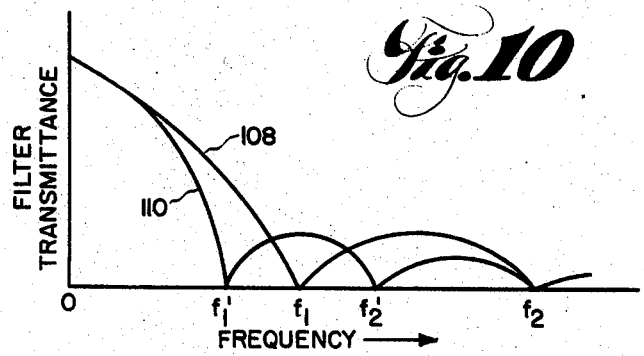

3,557,351

PROPERTY MEASUREMENT SIGNAL FILTERING METHOD AND APPARATUS FOR ELIMINATING PREDETERMINED COMPONENTS

FIELD OF THE INVENTION

This invention relates generally to industrial measuring systems or controlling systems for a process forming a material and more particularly to a novel method and means for removing the effect of uncontrollable variations from either the output data provided by a readout equipment or the control action exerted upon the material by an automatic controller.

In an industrial process for making paper or plastic sheet, a forming member is used to provide a strip of material having a desired thickness, moisture content or other physical property. Usually, the property is controllable by adjusting the screwdown of a pair of calendering rolls, a slice member, a valve, takeaway rolls or other property varying or controlling devices.

Measuring and automatic control systems have been provided for these processes. A gauge responsive to the property to be controlled is positioned downstream from the forming member to provide an error signal proportional to the deviation in the material property from a desired or target value therefor. An automatic controller responds to the error signal and causes an actuator to adjust the property controlling device so as to reduce the error and bring the material property on target. With respect to a discontinuous controller, once a correction is made by the controller, further correction is not initiated until the results of the control action are detectable by the property gauging device. The time lag is substantially equal to the time required for the material to travel from the property controlling device to the gauge. This is commonly known as a transportation lag $\tau$ and delay or disabling circuits are employed to prevent control actions during this period. As a result, it is seen that variations of the material property that occur at a rate faster than $\frac{1}{\tau}$ cannot be effectively controlled by the automatic control loop.

Roll gallop is one example. In this case, an out-of-round roll will produce periodic variations in the thickness of the material. Since the gauge must usually be located several roll diameters downstream from the eccentric roll, these variations occur at a rate greater than $\frac{1}{\tau}$. Since a discontinuous controller is periodically disabled for a time duration equal to $\tau$, any property components having a period shorter than $\tau$ are not controllable. Periodic property variations having frequency components greater than or less than $\frac{1}{\tau}$ may likewise be uncontrollable regardless of the type of controller employed. For example, a periodic disturbance in the material property may be induced by a device not connected to the automatic controller. In some cases, periodic variations may occur at a lower rate but they are nevertheless uncontrollable. All of these periodic variations are reflected by the error signal which exhibits predominant frequency components that change with the speed of the material passing the gauge. The frequency of any periodic variation will vary directly with speed.

These uncontrollable variations contribute significantly to the derived error signal causing either inadequate or over-control of the material property. For example, most automatic controllers employ some type of averaging device to derive a relatively longterm average value of the property being monitored. If several predominant uncontrollable frequency components are present, they are all averaged to provide a control signal. The effect is to bias or weight the control signal to the extent that a subsequent control action results in the material property having an average value different from target. If, for example, a single predominant frequency component is present in the error signal, the computed average value will vary depending on the time interval over which the error signal average is computed. A computed average property value different from the actual longterm average will be obtained if the period of signal averaging or integration is anything other than an integral multiple of the period of the uncontrollable variation.

DESCRIPTION OF THE PRIOR ART

One attempt to prevent response to a galloping roll is described in U.S. Pat. 3,100,410 issued Aug. 13, 1963 to L. R. Hulls et al. The patentees combine signals from a strain gauge, a thickness gauge, a roll position generator and a roll speed signal generator. A summation signal is averaged by a bank of capacitors to obtain a control signal. The capacitors are time-shared, each one averaging the summation signal over the period of time required for one revolution of the eccentric roll.

Other techniques such as manually increasing the time constant of the property measuring circuit have been employed.

These solutions are not always acceptable because they either do not provide an accurate longterm average or they suppress or eliminate signal data which is otherwise useful and required for accurately evaluating the industrial process being controlled.

SUMMARY OF THE INVENTION

A method and means for minimizing the effect of uncontrollable variations on the initiated control action is provided by suppressing only those frequency components resulting from uncontrollable variations in the material property to be controlled and including at least one of said predominant frequency components. A filtering technique is employed to remove the undesired signal data from the input of data display equipment or the automatic controller. The signal rejection frequencies are adjusted in accordance with the speed of the material passing the gauge.

In specific embodiments, I provide a low pass filter having an automatically adjustable upper cutoff frequency equal to $\frac{1}{\tau}$ to eliminate controller input data having high frequency components outside the available controller bandwidth dictated by the transportation lag. Alternatively, one or more slot filters are provided with adjustable center frequencies. In a further embodiment, an average of the gauge signal over several complete cycles of one of the predominant frequency components is obtained to minimize control errors which might otherwise be induced by the uncontrollable variations.

The latter method may be employed with particular advantage in the measurement and control of sheet profile, i.e., the variation of the material property as a function of the cross-sheet position or width dimension of the sheet. Frequently, it is required to measure and/or control the profile of the sheet with a zone control system such as employed on a cross-axis calender, a Fourdrinier headbox slice or an extruder die. I average the error signal as the gauge scans the sheet and control the speed of scan either across each zone or across the entire width to average an integral number of cycles of the uncontrollable frequency component. The actuator associated with each zone is controlled in accordance with the true average value of the variable over that region of the sheet controlled by the actuator. Readout of the true average value of thickness for each zone may be rendered by suitable display equipment.

It is therefore an object of the invention to provide an improved method and means for measuring and automatically controlling an industrial process.

It is another object of the invention to measure accurately the longterm average value of variations in a material property, some of which may be uncontrollable.

It is also an object of the invention to remove the effect of uncontrollable variations from the control action without compromising signal data useful for process evaluation.

BRIEF DESCRIPTION OF THE DRAWING

FIG. 1 is a block diagram of an industrial process monitored and controlled in accordance with one signal filtering embodiment of the invention;

FIG. 2 is a frequency spectrum showing the presence of uncontrollable frequency components and the desired rejection bands of the filter shown in FIG. 1;

FIG. 3 is a block diagram of an adjustable low-pass filter comprising an alternative embodiment of the present invention;

FIG. 4 is a circuit diagram of an R-C circuit having an adjustable time constant;

FIG. 5 is a multiple notch filter comprising an alternative embodiment of the present invention;

FIG. 6 is a block diagram of a thickness measuring control system providing for selectable time averaging of an error signal in accordance with the speed of the process;

FIG. 7a is a plot of the error signal vs. time;

FIG. 7b is a plot of averaging error vs. time;

FIG. 8 is a plot of averaging time vs. process velocity for the system shown in FIG. 6;

FIG. 10 is a graph showing the error signal transmittance frequency nulls resulting from the selectable time averaging used in the system of FIG. 6;

FIG. 11 is a diagrammatic view of a scanning speed control system for a scanning gauge monitoring a sheet product of a plastic extrusion process.

DESCRIPTION OF THE PREFERRED EMBODIMENTS

Figure 9:
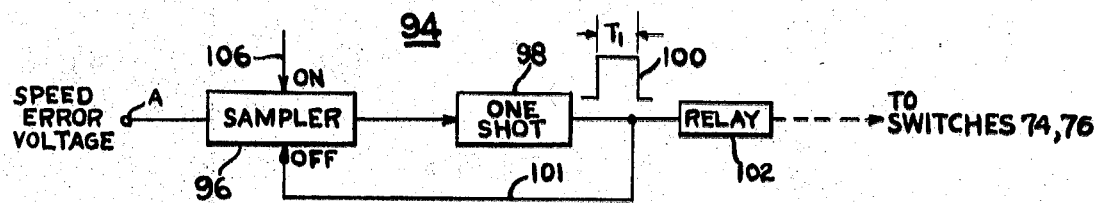
FIG. 9 is a block diagram of an averaging timer circuit useful in the control system of FIG. 6.

With reference now to the drawings and particularly to FIGS. 1 and 2, a material former 10 receives raw material supplied to a receiving hopper 12 as indicated by the large arrow 14. The former 10 provides a traveling length of material 16 having certain physical properties such as moisture content or thickness that, for economic reasons, must be measured and controlled within certain limits.

A material property transducer or gauge device 18 is positioned downstream a known distance, L, from the material former to provide over line 20 a signal proportional to changes in the physical property to be controlled. A signal processing unit 21 amplifies the gauge signal and transmits to a controller unit 22 and a readout device 23. Readout device 23 may be calibrated in units of the property being measured. Controller 22 responds to the signal to adjust an actuator 24 as indicated by the heavy dotted line 26. The actuator 24 is coupled to a valve or screw or other property controlling device incorporated in the material former 10 to alter the thickness, for example, of the formed material 16.

The control action may be either continuous or discontinuous. If a discontinuous control is used, a delay device 28 is employed to separate successive controller corrections by at least the transportation time $$\tau = \frac{L}{v} \qquad (1)$$

where v is the speed of the formed material 16. Delay unit 28 allows the gauge 18 sufficient time to detect the results of a prior correction by the controller 22.

Frequently, machine elements associated with the material former 10 malfunction causing periodic variations to appear in the property of the formed material 16. Periodic variations in thickness, for example, may appear as undulations on the surface of the material 16. They may be spaced apart by a wavelength distance, λ, usually much smaller than the spacing, L, between the gauge 18 and the material former.

A transformation can be made from the space to a frequency domain by noting that these periodic variation occur at a predominant rate or frequency $$f = \frac{v}{\lambda} \qquad (2)$$

From the typical signal energy spectrum 30 shown in FIG. 2 it is apparent that several of the frequency components may be present as indicated by the peaks 32. While only components having a frequency greater than $\frac{1}{\tau}$ are illustrated, there may be present periodic variations having a wavelength longer than L.

Frequently, the machine elements producing these periodic variations cannot be effectively controlled; the parts either deteriorate and wear with use or they cannot be manufactured economically to a closer mechanical tolerance. It is also economically unwise to shut down the industrial process to maintain or replace the defective machine parts. Nevertheless, they affect the control system by biasing the control action exerted by the controller 22 and by inducing other spurious responses that generally subtract from the optimum performance obtainable.

To eliminate the effect of these uncontrollable variations, I employ in FIG. 1 a filter circuit 34 which suppresses the undesired frequency components before they can affect the control action of controller 22. The filter 34 may have one or more signal rejection bands centered on each component frequency as indicated by the shaded spectral regions in FIG. 2. The filter 34 may be of the electrical, or electromechanical types which attenuate signal components lying in a narrow frequency band.

Since the frequency of these variations shift with the speed of the process, v, as indicated mathematically by equation (2) above and graphically by the dotted spectrum in 30' in FIG. 2, I measure the speed of the material preferably in the vicinity of the property gauge device 18. Since the speed of the material may vary depending on where the measurement is taken along the machine direction, a direct measurement is made at the location of the gauge 18 which translates the property variations into the signal components some of which are to be eliminated. A transducer 36 (see FIG. 1) responsive to the movement of the material 16 provides a signal on line 38 that varies as a function of the speed, v. A speed measuring servo 40 serves to translate changes in the speed signal into a mechanical or electrical effect by which the rejection band or bands of filter 34 are shifted. This coupling is indicated by the dotted line 42. Alternatively, the speed may be monitored by an operator. The operator may adjust the filter 34 to remove the undesired frequency components. Other speed measuring techniques may be employed with substantially equal utility.

My invention effectively suppresses each of the undesired components from the input to the automatic control circuit thereby precluding an inaccurate adjustment of the property-controlling device by the actuator 24. Moreover, the frequency bands of suppression are automatically displaced when the speed of the material changes. For example, as the material speeds up, the center frequency of each rejection band is increased. Conversely, a decrease in the speed of the process decreases the center frequency to "follow" the shift predominant component frequency.

Specific embodiments are illustrated in FIGS. 3, 4 and 5 to which reference may now be had.

Since at least in a discontinuous type control system, variations that occur at a rate faster than $\frac{1}{\tau}$ cannot be controlled, I provide a low-pass filter 31 (in FIG. 3) receiving the thickness signal on line 20 and having an upper cutoff frequency $f_{c.o.}$ adjustable in accordance with the measured speed of the sheet as determined by a sheet speed servo 33 or other speed responsive device. This may comprise an electromechanical device or, in a simple example, a parallel R-C circuit as shown in FIG. 4, wherein a variable capacitance C and a variable resistance R average a thickness signal on line 20. It is noted that either the resistance or the capacitance may be varied by speed servo 33, for example.

Either the generic low-pass filter 31 or the specific R-C circuit will eliminate variations that occur beyond the frequency $\frac{1}{\tau}$. Since the transportation lag $\tau$ decreases as the speed of the strip increases, the speed-sensitive units automatically increase the cutoff frequency $f_{c.o.}$ in FIG. 3, or decrease the effective R-C time constant of the circuit in FIG. 4. It is appreciated that other circuits may be used to effect the low-pass thickness signal filtering action. For example, a thyratron circuit may be used to provide a variable resistance which when combined with a capacitor provides a variable time constant in proportion to the magnitude of the speed signal applied to the grid circuit of the thyratron. The low-pass filter circuits of FIGS. 3 and 4 may be undesirable, however, in continuous type control systems wherein variations in the material property occurring at a rate greater than $\frac{1}{\tau}$ may be controllable and should not be removed by a wide-band signal filter.

In this case, the circuit shown in FIG. 5 may be employed with great advantage. In FIG. 5, a plurality of slot filters 35, 37 and 39, provide rejection of thickness signal components occurring at frequencies $f_1$, $f_2$ and $f_3$, for example. A sheet speed servo 41 serves to shift the filter slot frequencies when the sheet speed changes.

AVERAGING TIME CONTROL EMBODIMENT

Quite often there is only one predominant component frequency which affects the controller. Other components may be present but their combined effect may not adversely bias the desired control action. In this case, the property error signal may be sampled and averaged during intervals corresponding to several cycles of the disturbing waveform to provide a control signal substantially unaffected by the uncontrollable variation component of the material property.

In FIG. 6, I illustrate an error signal averaging circuit in which the averaging time is changed in accordance with the speed of the process. A calendering process includes a pair of rolls 44 and 46 that serve to smooth or reduce a strip of material 48. A thickness gauge 50 which may be of the nuclear radiation type is positioned adjacent to the strip as it exits the rolls 44 and 46. The gauge 50 includes a source of radiation 52 and a detector 54 for providing a signal representative of strip thickness, $t$. An amplifier 56 may be used to amplify the signal.

A difference computer 58 may be used to compare the measured strip thickness with a desired or target thickness, $t_0$. A target thickness signal may be provided on line 60 by manual means well known to those skilled in the art. The difference computer 58 provides an error signal $e$ on line 62 when the measured strip thickness deviates from the target thickness.

An averaging circuit 64 is used to compute the long term average value of the computed error signal. Alternatively, the raw thickness signal directly from detector 54 may be averaged. An indicator 66 and an automatic controller 68 each receive the averaged error signal. The indicator 66 displays the average thickness on a chart or other medium for the use of operating personnel. The automatic controller 68 energizes a roll screwdown actuator 70 coupled to the rolls 44 and 46 as indicated by the dotted line 72.

In accordance with my invention, operation of a pair of switches 74 and 76 connected to the input and to the output of the averaging circuit 64 is controlled in accordance with the speed of the strip 48. Closure of input switch 74 starts the integration of the error signal, $e$. After an elapsed time, $T_1$, switch 74 is opened and switch 76 is closed.

The averaging or integration time $T_1$ is selected in the manner graphically illustrated in FIG. 7. Periodic variations 78 are induced in the error signal, $e$, which reflect regular thickness perturbations caused, for example, by an eccentric roll 44 or 46. I prefer to average the thickness error signal over several complete cycles of the uncontrollable variation 78. In the time $T_1$, four complete cycles are averaged and the true average value is indicated by the solid, arrow-tipped line 80. It may be observed that an erroneous long term average results if the error signal is averaged over either an odd number of half cycles or fractional cycles of the disturbance. For example, a computed average value larger than the actual average results from a shorter integration time $T_2$ as indicated by the dotted, arrow-tipped line. Furthermore, the error increases as fewer cycles are averaged as indicated by the error curve 82. While the error is zero over integral multiples of one cycle, it is difficult in practice to average precisely one cycle as described in the Hulls et al., patent supra. Not only does the patented system produce a large error if the averaging time is slightly greater or less than the period of the disturbing waveform, but it also fails to provide the long term average which is the FIG. on which control is based. I prefer to choose an averaging time that extends over several cycles to reduce averaging errors and provide a true long term average thickness value. In a typical example, a time equal to two transport lags, $2\tau$, may be selected.

Since the disturbance frequency changes with material speed, the averaging time is changed with speed in the manner shown in FIG. 8. Generally, the averaging time is increased at slow calender speeds and increased at fast calender speeds.

Referring back to FIG. 6, a tachometer 84 having a pickup 86 contacting the strip 48 leaving the gauge 50 and provides a speed signal on line 88. A comparator device 90 produces a speed error voltage when the strip speed changes from a target value appearing on line 92. An averaging timer circuit 94 responds to the magnitude of the speed error voltage and controls the operation of the switches 74 and 76.

A typical circuit for the averaging timer circuit is illustrated in FIG. 9. The speed error voltage appearing at terminal A is monitored by a sampler 96 which may be a switch. A one-shot multivibrator 98 generates an output pulse 100 having an on-time $T_1$ in accordance with the magnitude of the speed error voltage. By setting the speed target at the largest expected calender speed, the magnitude of the speed error voltage increases as the calender speed drops. Pulse 100 therefore exhibits an on-time which is inversely proportional to calender speed as illustrated by the characteristic in FIG. 8. A relay 102 may be used to actuate the switches 74 and 76. Other averaging timer circuits may be employed with substantially equal utility.

This embodiment operates in the following manner. The material 48 passes from the rolls 44 and 46 through the thickness gauging device 50. The error signal on line 62 is provided in accordance with variations in the measuring thickness of the material from the target thickness $t_0$. The switch 74 is closed to enable the averaging circuit 64 to average variations that occur in the error signal $e$. The tachometer 84 measures the speed of the strip 48 and the averaging timer circuit 94 provides an output pulse 100 which maintains relay 102 energized. At the end of the averaging time determined by the width of pulse 100, relay 102 is deenergized and a pulse is transmitted over line 101 to disable the sampler 96. Whereupon the switch 74 is opened and switch 76 is closed. The average thickness value computed by the averaging circuit may be registered by the average thickness indicator 66. At the same time, automatic controller 68 will energize a screwdown actuator 70 in accordance with the magnitude of the average thickness. The output command from the automatic controller may also start a transportation lag timer 104. Lag timer 104 will generate a pulse on line 106 to reset the averaging timer 94 and permit a new average to be computed. Lag timer 104 requires a speed signal to be supplied as indicated since the time delay will be a function of the speed of the strip. Alternatively, lag timer 104 may be deleted to permit the averaging timer 94 to command a succession of averages to be computed. In this type of operation it is not necessary to connect line 10 from the output of one shot 98 to the sampler 96.

If the speed of the sheet should decrease, the averaging timer 94 would provide an output pulse 100 having a much longer duration due to the increased speed error voltage. Relay 102 would then keep switch 74 closed for longer or greater period of time. Since a relatively large speed error voltage exists at terminal A in FIG. 6, one shot 98 keeps relay 102 energized for a longer period of time. If the average value of the strip thickness is not changed, then averaging circuit 64 will read out the same average thickness value as previously registered by indicator 66 and automatic controller 68 will not request a correction from the screwdown actuator 70. In this case, some means other than the lag timer 104 must be used to reset the timer 94 automatically. For example, a clock pulse generator can be employed to operate the sampler by turning it on at frequent intervals unless an interdict signal is received from the lag timer 104. Construction of this device will be apparent to those skilled in the art. This allows sequential averaging of the thickness error signal e when there is no correction initiated by the automatic controller 68. It appears that the same number of cycles of the periodic roll disturbance are averaged independent of the speed of the process. It is important that the averaging time be long enough to average several cycles of the disturbance but not so long as to stagger or space successive necessary control actions, especially at low process velocities. In other words, it may be necessary to average a fewer number of cycles at a low process velocity in order to provide a sufficient number of corrections per unit time to reduce the amount of strip material not controlled.

The effect of my averaging time control is to provide a signal transmittance frequency characteristic as indicated in FIG. 10. The characteristics 108 and 110 exhibit the familiar $\frac{\sin x}{x}$ function wherein a plurality of transmittance nulls occur at frequencies dependent on the averaging time. Characteristic 108 is representative of the transmittance which occurs for the averaging time $T_1$ described above. Characteristic 110 is representative of the transmittance characteristic which results when the averaging time is increased for a somewhat smaller strip velocity. In this case it can be seen that the first frequency null occurs at a lower frequency $f_1'$ than it does for the case of the higher strip speed characteristic 108. In view of the general attenuation of the higher frequency components by the filtering action, it may be desirable to employ an amplifier having a gain which is a reciprocal function of frequency in order to eliminate low frequency emphasis. Quite often, however, the high frequency attenuation is desirable as the actuator 70 cannot respond to the signal components due to the rather large moments of inertia associated with the screwdown actuation of the rolls 44 and 46.

SCANNING SPEED CONTROL EMBODIMENT

With reference now to FIG. 11, I provide a method and means for controlling the speed of a scanning gauge 120 movable across a traveling sheet. A sheet 122 may be provided by a paper machine or a plastic extruder 124, for example, having a plurality of thickness actuators 126, 127 and 129 spaced across the width of the sheet. Drive means 130 may be provided to move the screw or other forming member inside the plastic extruder. While only a left, center and right actuator for die lip adjustment are shown, several more may be provided. Each of the actuators 126—128 controls the thickness of the sheet predominantly along a zone extending down the length of the sheet in the machine direction, as defined by the dotted lines 132.

The thickness of the sheet 122 is measured by gauge 120 that is movable across the sheet from a position 120a on a pair of traversing rods 134. As the gauge moves across the sheet, a signal is developed on line 136 which is amplified at amplifier 138 and transmitted to a scanning integrator 140. Since the sheet is moving in the machine direction, the heavy dotted line 142 indicates the region of the sheet measured by the gauge as it moves from one side to the other.

Figure 12:
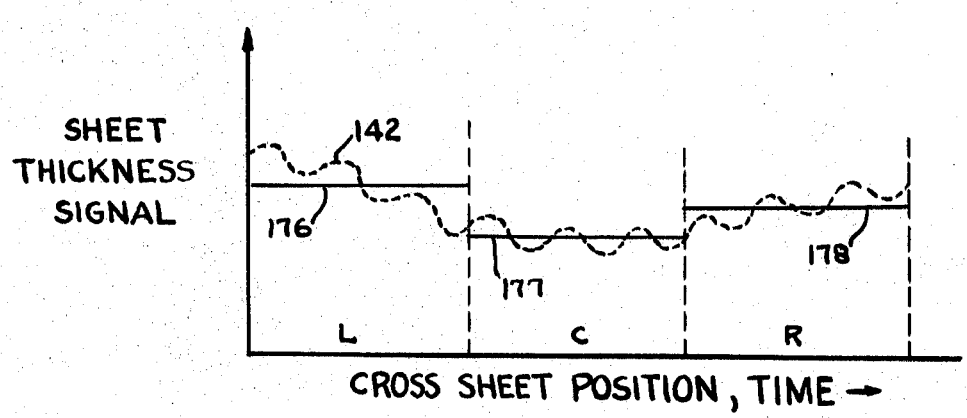
FIG. 12 is a graph of a typical profile and zone averages produced by the system shown in FIG. 11.

The signal provided by the gauge 120 may vary as indicated in FIG. 12. The curvilinear trace 142 shown by the dotted line is observed to contain at least one uncontrollable periodic variation or frequency component produced in response to some element in the plastic extruder 124 and correlated with the speed of the sheet as it is translating in the forward direction. It is desirable to compute the average value of the sheet thickness profile to eliminate the effect of these high frequency variations.

To this end, scanning integrator 140 is operated by commands from a scan controller unit 144 (see FIG. 11). Portions of the scan controller 144 and scanning integrator 140 are described in U.S. Pat. No. 3,015,129 issued Jan. 2, 1962 to W. C. Hays et al., and assigned to the same assignee as the present invention. Briefly, integrator 140 computes the average thickness of variations occurring across the width of sheet 122.

In accordance with the present invention, a tachometer 145 is coupled to the sheet and supplies a signal to a scan time computer 146 which estimates a time T equal to the period of a number of complete cycles of the disturbance shown in FIG. 12. I move the gauge 120 across the sheet at a scan speed $V_S$ such that an integral number of cycles are averaged when going from one side of the sheet to the other. This requires a scan speed $V_S$ to be computed from the following equation:

$$V_s = \frac{W}{T} \qquad (3)$$

where W is the width of the sheet. A scan speed computer 148 solves equation (3) by computing the ratio of sheet width, W, to desired scan averaging time, T.

A width signal generator 150 provides a width signal over line 152 to computer 148.

If the width is constant or known, the signal may be provided by a manually operated voltage divider circuit. Known width gauges, of the acoustic or pneumatic type, may be used to provide a continuous indication of sheet width should it be subject to variation.

A computed scan speed signal is transmitted by computer 148 to the scan controller 144 over line 154. Whereupon the scan controller adjusts the speed of traversing motor 156 used to move the gauge 120 from one side of the sheet to the other. The scan controller 144 enables the scanning integrator 140 when the gauge is at the left-hand edge of the sheet 122 at the position 120a. Scanning integrator 140 is disabled as soon as the gauge 120 reaches the right-hand edge of the sheet. Limit switches 160 may be provided at each edge of the sheet to indicate to the scan controller when the gauge is positioned at these points. As soon as the gauge reaches the right-hand edge of the sheet, a stop and readout signal is transmitted over dotted line 162 by the scan controller 144 to enable the scanning integrator 140 to be read out. Since the scanning speed is such that the width is scanned in the desired time T, several complete cycles are averaged and the output voltage of the scanning integrator 140 will be proportional to the true average thickness of the sheet along the path of measurement. Again, the computed average may be either indicated by a chart recorder 164 providing a chart 166 or used for purposes of controlling the extruder drive means 130. This latter function is accomplished by an automatic controller 170 which attempts to alter the extruder drive 130 in the manner indicated in the aforementioned Hays et al., patent so that the sheet thickness is maintained substantially at the target thickness set in by a target thickness setter 172.

It is apparent from FIG. 12 that several complete cycles of the disturbance are measured to enable the computation of a true longterm average value of the product thickness. If, of course, either the width or the speed of the sheet changes, a different scan speed is required. For example, an increase in sheet speed will be detected by the tachometer 145 and a shorter scan time T will be computed in accordance with the equation (2) supra by computer 146. This causes the scan controller 144 to move the gauge at a faster rate across the sheet, assuming that the width of the sheet 122 remains constant. Variations in sheet width will affect the scanning speed as indicated by the equation (3) above. The inverse relationship between sheet speed and scan velocity occurs since $f = \frac{1}{T}$ and $f = \frac{v}{\lambda}$, whereby computer 146 derives an output signal proportional to $T = \frac{\lambda}{v}$. The constant $\lambda$ is set into computer 146 as an a priori term from the known characteristics of extruder 124 and may change from zone to zone because the extruder may have different characteristics in each cross sheet zone. In such an event, as gauge 120 is scanned across the sheet, different values of λ are set into computer 146 as the gauge reaches different zones.

While this system allows the measurement and control of an overall average sheet thickness, it may be desirable to compute the average zone thickness and to control the zone actuators 126—128 in accordance with the computed zone average. For this reason, a separate zone scan time may be computed. A plurality of limit switches 174 are located across the width of the sheet at the edges of the zones. In this way, the scan speed may be adjusted according to the width of each zone and the speed of the sheet. This provides one way to average over several variations 142 of the uncontrollable variable that occur in each zone (see FIG. 12). In the illustration of FIGS. 11 and 12, it is noted that three complete cycles of the uncontrollable variation 142 are averaged for each zone, left, center and right. The average value computed for these zones is indicated by the horizontal lines 176, 177, and 178, respectively. If the zones are of unequal width and it is desired to average over the same number of cycles for each zone, it will of course be necessary to change the scanning speed for each zone, scanning much slower in a narrow zone than in a wider zone. The automatic controller 170 may adjust each zone actuator in accordance with the average value computed for the zone controlled by that actuator. Irrespective of the number of zones or their individual widths, it is apparent that the uncontrollable variations will have no effect on the computed average value, since an integration is performed over an integral number of cycles of a predominant frequency component.

The use of an integrator that receives the thickness error signal, i.e., deviation from target, is only one example. The integrator could receive the entire gauge signal for averaging. The averaged signal could then be compared with a target to generate a control signal or other indication of the average thickness value. Other circuits will be apparent to those skilled in the art.

Although certain specific embodiments of the invention have been shown and described herein, many modifications may be made thereto without departing from the true spirit and scope of the invention as set forth in the appended claims.

I claim:

1. The method of adjusting a machine device having a property controlling member for providing a length of material having a controlled property wherein a gauge provides a signal derived from a measurement of variations in said material property, and a utilization device is responsive to said gauge signal, a portion of said property variations being uncontrollable and reflected in said gauge signal, said uncontrollable variations having at least one predominant frequency dependent on the speed of said material, said method comprising the steps of:

sensing the speed of said material in the vicinity of said gauge; and suppressing said predominant frequency component of said gauge signal by altering the band-pass of said gauge in accordance with said material speed to minimize the effect of said uncontrollable variations in said material property of said utilization device.

2. The method of adjusting a machine device having a property controlling member for providing a length of material having a controlled property wherein a gauge device provides a signal derived from a measurement of variations in said material property, a utilization device is responsive to said gauge signal, a portion of said property variations being uncontrollable and reflected in said gauge signal, said uncontrollable variations having more than one predominant frequency component dependent on the speed of said material, said method comprising the steps of:

sensing the speed of said material in the vicinity of said gauge; and suppressing each of said predominant frequency components of said gauge signal in accordance with said material speed to minimize the effect of said uncontrollable variations in said material property on said utilization device.

3. The method of claim 2 which includes the steps of:

filtering out frequency components of said signal lying in narrow frequency bands; and the center frequency of said bands in accordance with the speed of said material.

4. The method of adjusting a machine device having a property controlling member for providing a length of material having a controlled property wherein a gauge device provides a signal derived from a measurement of variations in said material property, and a utilization device is responsive to said gauge signal, a portion of said property variations being uncontrollable and reflected in said gauge signal, said uncontrollable variations having at least one predominant frequency component dependent on the speed of said material, said method comprising the step of; controlling the averaging time of said gauge signal in accordance with the speed of said material to average several complete cycles of said predominant frequency component to minimize the effect of said uncontrollable variations in said material property on said utilization device.

5. The method of adjusting a machine device having a property controlling member for providing a length of material having a controlled property wherein a gauge provides a signal derived from a measurement of variations in said material property, and a utilization device is responsive to said gauge signal, a portion of said property variations being uncontrollable and reflected in said gauge signal, said uncontrollable variations having at least one predominant frequency component dependent on the speed of said material, said method comprising the steps of:

measuring the speed of said material to provide a signal proportional thereto; and averaging said gauge signal over a period of time proportional to said speed signal to average several complete cycles of said predominant frequency component and minimize the effect of said uncontrollable variations in said material property on said utilization device.

6. The method of adjusting a machine device having a property controlling member for providing a length of sheet material having a controlled property and a substantially constant width wherein a gauge is movable from one side of said sheet to the other to scan said sheet and provide a signal proportional to deviations in said material property, an averaging device averages said gauge signal as said gauge scans across the width of said sheet to provide an output signal and a utilization device is responsive to said output signal, a portion of said property variations being uncontrollable and reflected as variations in said gauge signal, said uncontrollable variations having at least one predominant frequency component dependent on the speed of said sheet, said method comprising the step of; controlling the scanning speed of said gauge in accordance with the speed of said sheet to average said signal over several complete cycles of said predominant frequency component and minimize the effect of said uncontrollable variations on said utilization device.

7. The method of adjusting a machine device having a property controlling member for providing a length of sheet material having a controlled property and a substantially constant width wherein a gauge is movable from one side of said sheet to the other to scan said sheet and provide a signal proportional to deviations in said material property, an averaging device averages said signal as said gauge scans across the width of said sheet to provide an output signal and a utilization device is responsive to said output signal, a portion of said property variations being uncontrollable and reflected as variations in said gauge signal, said uncontrollable variations having at least one predominant frequency component dependent on the speed of said sheet, said method comprising the steps of:

measuring the speed of said sheet; and maintaining the scanning speed of said gauge in accordance with said measured sheet speed to average said signal over several complete cycles of said predominant frequency component and minimize the effect of said uncontrollable variations on said utilization device.

8. The method of adjusting a machine device having a property controlling member for providing a length of sheet material having a controlled property wherein a gauge is movable from one side of said sheet to the other to scan said sheet and provide an error signal proportional to deviations in said material property from a target value therefor, an integrator averages said error signal as said gauge scans across the width of said sheet to provide a control signal and an actuator responsive to said control signal is coupled to said property controlling member to control said variations in said material property, a portion of said property variations being uncontrollable and reflected as variations in said error signal, said uncontrollable variations having at least one predominant frequency component dependent on the speed of said sheet, said method comprising the steps of:

measuring the speed of said sheet;

computing a scan time proportional to said measured sheet speed;

measuring the width of said sheet;

computing a scanning speed for said gauge proportional to the ratio of said measured sheet width to said computed scan time; and moving said gauge across said sheet at said computed scanning speed to provide an error signal averaged over several complete cycles of said predominant frequency component to minimize the effect of said uncontrollable variations on said control signal.

9. The method of adjusting a machine device having a property controlling member for providing a length of sheet material having a controlled property wherein a gauge is movable from one side of said sheet to the other to scan said sheet and provide an error signal proportional to deviations in said material property from a target value therefor, an integrator averages said error signal as said gauge scans across the width of said sheet to provide a control signal and an actuator responsive to said control signal is coupled to said property controlling member to control said variations in said material property, a portion of said property variations being uncontrollable and reflected as variations in said error signal, said uncontrollable variations having at least one predominant frequency component dependent on the speed of said sheet, said method comprising the steps of:

maintaining the scanning speed of said gauge in accordance with the speed of said sheet to average said error signal over several complete cycles of said predominant frequency component and minimize the effect of said uncontrollable variations on said control signal; and controlling said property controlling member in accordance with said control signal.

10. The method of adjusting a machine device having a property controlling member for providing a length of sheet material having a controlled property wherein a gauge is movable from one side of said sheet to the other to scan said sheet and provide an error signal proportional to deviations in said material property from a target value therefor, an integrator averages said error signal as said gauge scans across the width of said sheet to provide a control signal and an actuator responsive to said control signal is coupled to said property controlling member to control said variations in said material property, a portion of said property variations being uncontrollable and reflected as variations in said error signal, said uncontrollable variations having at least one predominant frequency component dependent on the speed of said sheet, said method comprising the steps of:

measuring the speed of said sheet;

dividing the width of said sheet into a plurality of zones;

computing a scan time for each zone in accordance with the measured sheet speed to provide a control signal for each zone averaged over an integral number of cycles of said predominant frequency component;

maintaining an average scan speed for each zone in accordance with said computed scan time; and automatically controlling each appropriate section of said property controlling member in accordance with the control signal associated with the zone controlled by said section.

11. Control apparatus for adjusting a property controlling member to provide a length of material having a controlled property wherein a gauge device provides a signal derived from a measurement of variations in said material property, and a utilization device is responsive to said gauge signal, a portion of said property variations being uncontrollable and reflected in said gauge signal, said uncontrollable variations having more than one predominant frequency component dependent on the speed of said material, said apparatus comprising:

means for providing an indication of the speed of said material; and means responsive to said speed indication for suppressing each of said predominant frequency components of said gauge signal to minimize the effect of said controllable variations on said utilization device.

12. Control apparatus as in claim 11 wherein said frequency suppressing means comprises a band-pass filter having an upper cutoff frequency adjustable in accordance with said material speed indication.

13. Control apparatus as in claim 11 wherein said frequency suppressing means comprises a resistance-capacitance circuit having an adjustable time constant.

14. Control apparatus as in claim 11 wherein said frequency suppressing means comprises a plurality of slot filters each having a different center-frequency adjustable in accordance with the speed of said material.

15. Control apparatus for adjusting a property controlling member to provide a length of material having a controlled property wherein a gauge device provides a signal derived from a measurement of variations in said material property, and a utilization device is responsive to said gauge signal, a portion of said property variations being uncontrollable and reflected in said gauge signal, said uncontrollable variations having a plurality of predominant frequency components dependent on the speed of said material, said apparatus comprising; means for providing an indication of the speed of said material, and means responsive to said speed indication for suppressing each of said predominant frequency components of said gauge signal to minimize the effect of said uncontrollable variations on said utilization device.

16. Control apparatus for adjusting a property controlling member to provide a length of material having a controlled property wherein a gauge-controller provides a control signal derived from a measurement of variations in said material property, and an actuator responsive to said control signal is coupled to said property controlling member to correct variations in said material property, said period between successive corrections being equal to or greater than the transportation time required for material to travel from said property-controlling member to said gauge-controller, said transportation time being a function of the speed of said material, said apparatus comprising:

means for generating a signal proportional to the speed of said material, low pass filter means having an adjustable high frequency cutoff, and means responsive to said speed signal for automatically adjusting said filter high frequency cutoff to substantially eliminate from said control signal the effect of property variations having a frequency greater than the reciprocal transportation time.

17. Control apparatus for adjusting a property controlling member to provide a length of material having a controlled property wherein a gauge provides a signal derived from a measurement of variations in said material property, an averaging device averages said gauge signal, and a utilization device is responsive to averaged gauge signal, a portion of said property variations being uncontrollable and reflected in said gauge signal, said uncontrollable variations having at least one predominant frequency component dependent on the speed of said material, said apparatus comprising:

means for generating a signal proportional to the speed of said material, means responsive to said speed signal for computing an averaging time substantially equal to the time required for several complete cycles of one said predominant frequency component, and means for averaging said gauge signal over said computed averaging time to minimize the effect of said uncontrollable variations on said utilization device.

18. Control apparatus for adjusting a property controlling member to provide a length of material having a controlled property wherein a gauge-controller averages a signal derived from a measurement of variations in said material property, and an actuator responsive to said averaged signal is coupled to said property controlling member to control said variations in said material property, a portion of said property variations being uncontrollable and reflected in said signal, said uncontrollable variations having at least one predominant frequency component dependent on the speed of said material, said apparatus comprising:

a tachometer coupled to said material for providing a signal proportional to the speed of said sheet, switch means coupling said signal to said averaging circuit, and an averaging time computer responsive to the magnitude of said speed signal for controlling the operation of said switch means for averaging said signal over a plurality of complete cycles of said predominant frequency component to minimize the effect of said uncontrollable variations on said actuator.

19. Control apparatus for adjusting a property controlling member to provide a length of sheet material having a controlled property and a substantially constant width, wherein a gauge is movable from one side of said sheet to the other to scan said sheet and provide a signal proportional to deviations in said material property, an averaging device averages said gauge signal as said gauge scans across the width of said sheet to provide an output signal, and a utilization device is responsive to said output signal, a portion of said property variations being uncontrollable and reflected as variations in said gauge signal, said uncontrollable variations having at least one predominant frequency component dependent on the speed of said sheet, said apparatus comprising; means for controlling the scanning speed of said gauge in accordance with the speed of said sheet to average said gauge signal over several complete cycles of said predominant frequency component to minimize the effect of said uncontrollable variations on said utilization device.

20. Control apparatus for adjusting a property controlling member to provide a length of sheet material having a controlled property and a substantially constant width, wherein a gauge is movable from one side of said sheet to the other to scan said sheet and provide a signal proportional to deviations in said material property, an averaging device averages said gauge signal as said gauge scans across the width of said sheet to provide an output signal, and a utilization device is responsive to said output signal, a portion of said property variations being uncontrollable and reflected as variations in said gauge signal, said uncontrollable variations having at least one predominant frequency component dependent on the speed of said sheet, said apparatus comprising:

means for measuring the speed of said sheet, and means responsive to said measured sheet speed for controlling the scanning speed of said gauge to average said gauge signal over several complete cycles of said predominant frequency component and minimize the effect of said uncontrollable variations on said utilization device.

21. Control apparatus for adjusting a property controlling member to provide a length of sheet material having a controlled property, wherein a gauge is movable from one side of said sheet to the other to scan said sheet and provide an error signal proportional to deviations in said material property from a target value therefor, an averaging device averages said error signal as said gauge scans across the width of said sheet to provide a control signal and an actuator responsive to said control signal is coupled to said property controlling member to control said variations in said material property, a portion of said property variations being uncontrollable and reflected as variations in said error signal, said uncontrollable variations having at least one predominant frequency component dependent on the speed of said sheet, said apparatus comprising:

means for measuring the speed of said sheet, means for computing a scan time proportional to said measured sheet speed and equal to an interval of time required for an integral number of complete cycles of said predominant frequency component, means for measuring the width of said sheet, means responsive to said measured sheet width and computed scan time for providing a scanning speed signal, and drive means responsive to said scanning speed signal for moving said gauge across said sheet at a preferred speed to minimize the effect of uncontrollable variations on said averaged error signal.

22. Control apparatus for adjusting a property controlling member to provide a length of sheet material having a controlled property, wherein a gauge is movable from one side of said sheet to the other to scan said sheet and provide an error signal proportional to deviations in said material property from a target value therefor, an averaging device averages said error signal as said gauge scans across the width of said sheet to provide a control signal and an actuator responsive to said control signal is coupled to said property controlling member to control said variations in said material property, a portion of said property variations being uncontrollable and reflected as variations in said error signal, said uncontrollable variations having at least one predominant frequency component dependent on the speed of said sheet, said apparatus comprising:

a tachometer coupled to said sheet for providing a signal proportional to the speed of said sheet, means for measuring the average value of said property in each of a plurality of zones of predetermined width extending down the length of said sheet including, means responsive to said sheet speed signal for providing a zone scan time substantially equal to the time required for an integral number of complete cycles of said predominant frequency component, and means for controlling the speed of said gauge across each of said zones in accordance with said zone scan time, said average value measuring means providing a zone control signal from which the effect of said uncontrollable variations in said property is substantially eliminated, and means for utilizing said measured average property values for each of said zones.

23. Control apparatus as set forth in claim 22 which further includes means for selectively controlling said property controlling member in accordance with the control signal associated with the zone.

24. Control apparatus for adjusting a thickness controlling member to provide a sheet of material having a desired thickness, wherein a gauge is movable from one side of the sheet to the other to scan said sheet and provide an error signal proportional to deviations in the thickness of said material from said desired value, an integrator averages said error signal as said gauge scans across the width of said sheet to provide a control signal and an actuator responsive to said control signal is coupled to said thickness controlling member to control said thickness variations, a portion of said thickness variations being uncontrollable and reflected as periodic variations in said error signal, said uncontrollable variations having at least one predominant frequency component dependent on the speed of said sheet, said apparatus comprising:

a tachometer for providing a voltage proportional to the speed of said sheet, circuit means for measuring the average thickness of said sheet in each of a plurality of zones extending down the length of said sheet including, a gauge for providing a signal indicative of the width of each zone, computer means responsive to said tachometer voltage and said zone width signals for providing a zone scan time substantially equal to the time required for an integral number of complete cycles of said predominant frequency component, and scan controller means responsive to said computed zone scan times for controlling the speed of said thickness gauge across each of said zones, said integrator providing an average thickness signal for each zone from which the effect of said uncontrollable thickness variations is substantially eliminated.

25. A system for deriving an indication of the average value of a property of a sheet translating longitudinally in a first direction without indicating the magnitude of spatial periodic variations imposed on the sheet comprising a gauge for deriving a response indicative of the property, means for scanning the gauge across the sheet in a direction between the sheet edges, means for controlling the scanning velocity of the gauge in response to an indication of the speed of the sheet in said first direction, and means for indicating the average value of the gauge response over the period while it scans across at least a predetermined portion of the sheet.

26. The system of claim 25 wherein said scanning velocity control means includes means responsive to the movement of the sheet in the first direction for deriving a signal indicative of the sheet speed in the first direction, and means for controlling the gauge scanning velocity in response to the sheet speed signal.

27. A method of indicating the average value of a property of a sheet translating longitudinally in a first direction without indicating the magnitude of spatial periodic variations imposed on the sheet comprising the steps of scanning a gauge for the property in a direction between the sheet edges at a speed determined by the speed of the sheet in the first direction, and indicating the average value of the gauge response over the period while it scans across at least a portion of the sheet, the average value being determined for a time interval commensurate with at least one of the spatial variations.

28. A system for deriving an indication of the average value of a property of a sheet translating longitudinally in a first direction without indicating the magnitude of spatial periodic variations imposed on the sheet, said sheet being divided into a plurality of cross sheet zones each running along the length of the sheet, said spatial variations being susceptible to different periodicities in the different zones, comprising a gauge for detecting the property, means for scanning the gauge in a direction between the edges of the sheet, means for controlling the scanning velocity of the gauge in each of the zones in response to indications of the sheet velocity in the first direction and the spatial periodicity for the zone where the gauge is located, and means for separately averaging the guage response for each of said zones.

29. The system of claim 28 wherein said scanning velocity control means includes means responsive to the movement of the sheet in the first direction for deriving a signal indicative of the sheet speed in the first direction, and means for controlling the gauge scanning velocity in response to the sheet speed signal.

30. A method of deriving an indication of the average value of a property of a sheet translating longitudinally in a first direction without indicating the magnitude of spatial periodic variations imposed on the sheet, said sheet being divided into a plurality of cross sheet zones each running along the length of the sheet, said spatial variations being susceptible to different periodicities in the different zones, comprising scanning a gauge for detecting the property in a direction between the edges of the sheet, controlling the scanning velocity of the gauge in each of the zones in response to indications of the sheet velocity in the first direction and the spatial periodicity for the zone where the gauge is located, and separately averaging the gauge response while the gauge scans across each of said zones, the average value being determined for a time interval commensurate with at least one of the spatial periodic variations.

UNITED STATES PATENT OFFICE
CERTIFICATE OF CORRECTION

Patent No. 3,557,351          Dated January 19, 1971

Inventor(s) George I. Doering

It is certified that error appears in the above-identified patent and that said Letters Patent are hereby corrected as shown below:

column 3, line 42, "transmits to" should read -- transmits it to --.

column 10, line 9, "the center frequency" should read -- varying the center frequency --.

Signed and Sealed this

Twenty-first Day of September 19

[SEAL]

Attest:

RUTH C. MASON
*Attesting Officer*

C. MARSHALL DANN
*Commissioner of Patents and Trademarks*